United States Patent [19]
Ueda

[11] Patent Number: 5,710,980
[45] Date of Patent: Jan. 20, 1998

[54] CELL SITE TESTING METHOD FOR PORTABLE RADIO COMMUNICATION SYSTEM

[75] Inventor: Keiichi Ueda, Tokyo, Japan

[73] Assignee: NEC Corporation, Tokyo, Japan

[21] Appl. No.: 630,345

[22] Filed: Apr. 10, 1996

[30] Foreign Application Priority Data

Apr. 21, 1995 [JP] Japan ................................ 7-096473

[51] Int. Cl.[6] ................................................ H04B 17/00
[52] U.S. Cl. .................................... 455/67.4; 455/56.1
[58] Field of Search ........................... 379/59, 60, 1, 379/27, 29, 58; 455/33.1, 53.1, 54.1, 56.1, 67.1, 67.3, 67.4, 67.7, 9, 33.4

[56] References Cited

U.S. PATENT DOCUMENTS 5,410,753  4/1995  Szabo .............................. 455/67.4
5,425,076  6/1995  Knippelmier ..................... 455/67.1

FOREIGN PATENT DOCUMENTS 5-30046  2/1993  Japan ............................... 455/67.4

Primary Examiner—Nguyen T. Vo
Attorney, Agent, or Firm—Young & Thompson

[57] ABSTRACT

In response to a testing instruction from a PHSC, the cell range of CS 4a is expanded from a range indicated by a solid line to another range indicated by a broken line in which CS 4a can communicate with CSs 4b, 4g and 4f as well as other CSs not shown adjacent to CS 4a. Under the control of the PHSC, test calls are successively produced from CS 4a and transmitted to CSs 4b, 4g, 4f and all other adjacent CSs not shown to confirm the normality of connection. Then, in a similar manner as described above, the PHSC repeats this operation successively for all CSs and confirms the normality of the CSs from obtained results. When an abnormal condition is found out in a test result, the PHSC analogizes from a combination of test routes to specify the abnormal CS.

2 Claims, 2 Drawing Sheets

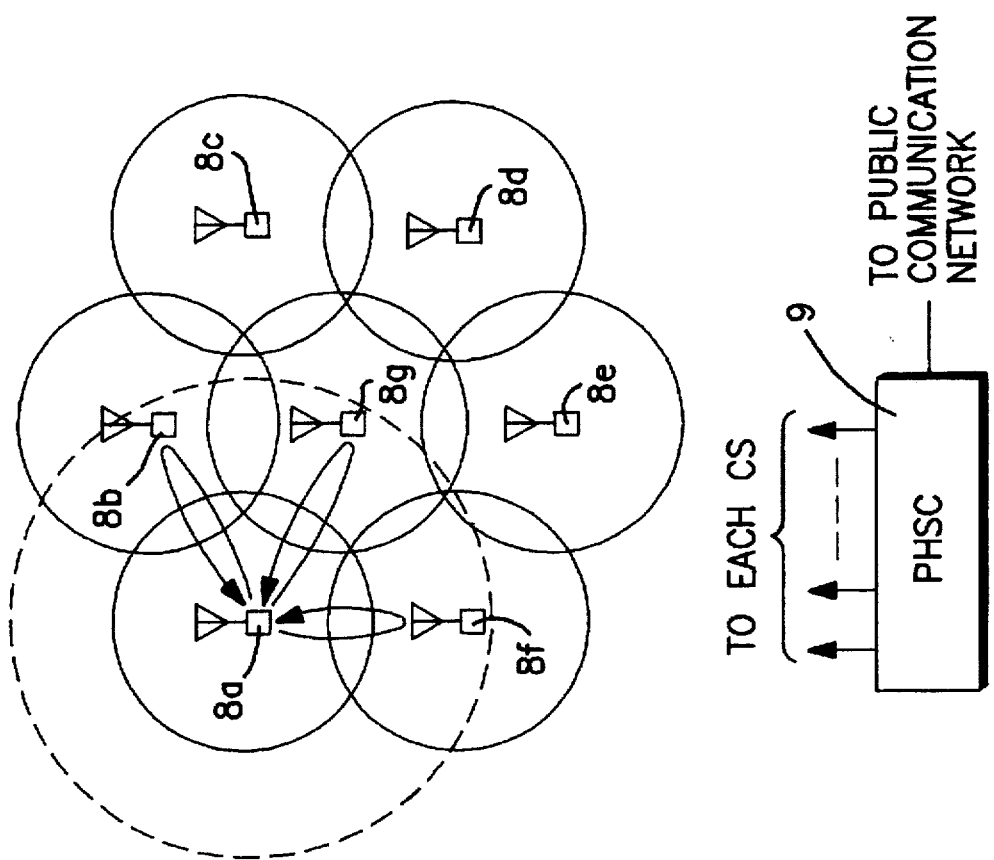
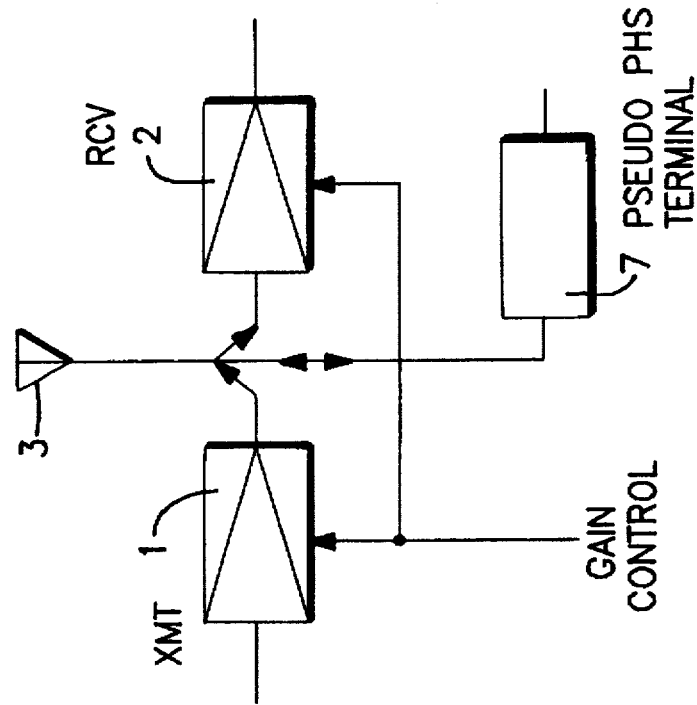

CELL SITE TESTING METHOD FOR PORTABLE RADIO COMMUNICATION SYSTEM

BACKGROUND OF THE INVENTION

1. Field of the Invention

This invention relates to a cell site testing method for a portable radio communication system, and more particularly to a cell site testing method for a portable radio communication system such as a personal handy phone system (PHS).

2. Description of the Related Art

A portable radio communication system such as a PHS is connected, in order to perform communication, to a public telephone network or an ISDN network via a cell site (hereinafter referred to as CS), which is a radio base station, and a connection control equipment. Accordingly, in order to perform radio communication normally, the CS is required to be normal. Therefore, a testing method for confirming the normality of the CS is required. While no available testing method is known, the following methods seem applicable.

The first testing method is that a service engineer who carries a PHS terminal goes to a location in the proximity of each CS and originates a test call using the PHS terminal to confirm the normality of the CS. The second method is that a testing PHS terminal is installed at the central location between two adjacent CSs and a test call is originated using the testing PHS terminal to confirm the normality of the CSs.

However, where the first testing method described above is employed, human labor of service engineers who maintain a radio area of a wide range formed from a plurality of CSs is considerably heavy. Further, since a large number of service engineers are required, the first testing method is disadvantageous from the point of view of economy and efficiency. Meanwhile, the second testing method described above is very uneconomical because a large number of testing PHS terminals must be installed separately for several hundreds to several thousands CSs.

SUMMARY OF THE INVENTION

The present invention has been made in view of the foregoing statement, and it is an object of the present invention to provide a cell site testing method for a portable radio communication system which can test a cell site efficiently and economically.

In order to attain the object described above, according to the present invention, there is provided a cell site testing system for a portable radio communication system wherein each of a plurality of cell sites located at the centers of individual cell ranges performs radio communication with a portable radio terminal which resides in the cell range of the cell site and allows communication between the portable radio terminal and another terminal of another communication network via a connection control equipment, configured such that

- each of the plurality of cell sites includes means for increasing the transmitting and receiving capacities in response to a testing instruction from the connection control equipment so that the cell range of the cell site may include adjacent ones of the cell sites, and means of transmitting a test call for producing and transmitting a test call, and
- the connection control equipment performs collation between a received signal and a transmitted signal from and to an adjacent one of the plurality of cell sites, to which the testing instruction has been delivered, successively for all of the cell sites and performs determination between the normality and the abnormality of the cell sites based on obtained results of the collation.

The cell site testing system for a portable radio communication system is further configured such that each of the plurality of cell sites further includes a pseudo portable radio terminal, and the connection control equipment performs operation for causing one of the plurality of cell sites, to which the testing instruction has been delivered, to transmit a test signal so that the test signal is transmitted back from the pseudo portable radio terminal provided in each cell site adjacent to the one of the plurality of cell sites, to the one of the plurality of cell sites to which the testing instruction has been delivered, and collating the transmitted test signal and the received test signal of the one of the pluallty of cell sites to which the testing instruction has been delivered, successively for all of the cell sites and performs determination between the normality and the abnormality of the cell sites based on results of the collation.

In the present invention, since the connection control equipment performs collation between a received signal and a transmitted signal from and to an adjacent one of the plurality of cell sites, to which the testing instruction has been delivered, successively for all of the cell sites and performs determination between the normality and the abnormality of the cell sites based on obtained results of the collation, the plurality of cell sites can be tested without provision of a pseudo portable radio terminal for each of the plurality of cell sites and without the necessity for a maintenance engineer to go to the individual CSs. Further, when a pseudo portable radio terminal is provided in each of the plurality of cell sites, collation between a transmitted test signal and a received test signal to and from a cell site to which a testing instruction has been delivered by the connection control equipment is performed successively for all of the cell sites, and determination between the normality and the abnormality of the cell sites can be performed based on obtained results of the collation.

BRIEF DESCRIPTION OF THE DRAWINGS

FIG. 2(A) and FIG. 2(B) respectively depict a view showing a configuration of the essential part and a testing procedure of the second embodiment of a system of the present invention;

DETAILED DESCRIPTION OF THE PREFERRED EMBODIMENTS

Figure 1B:
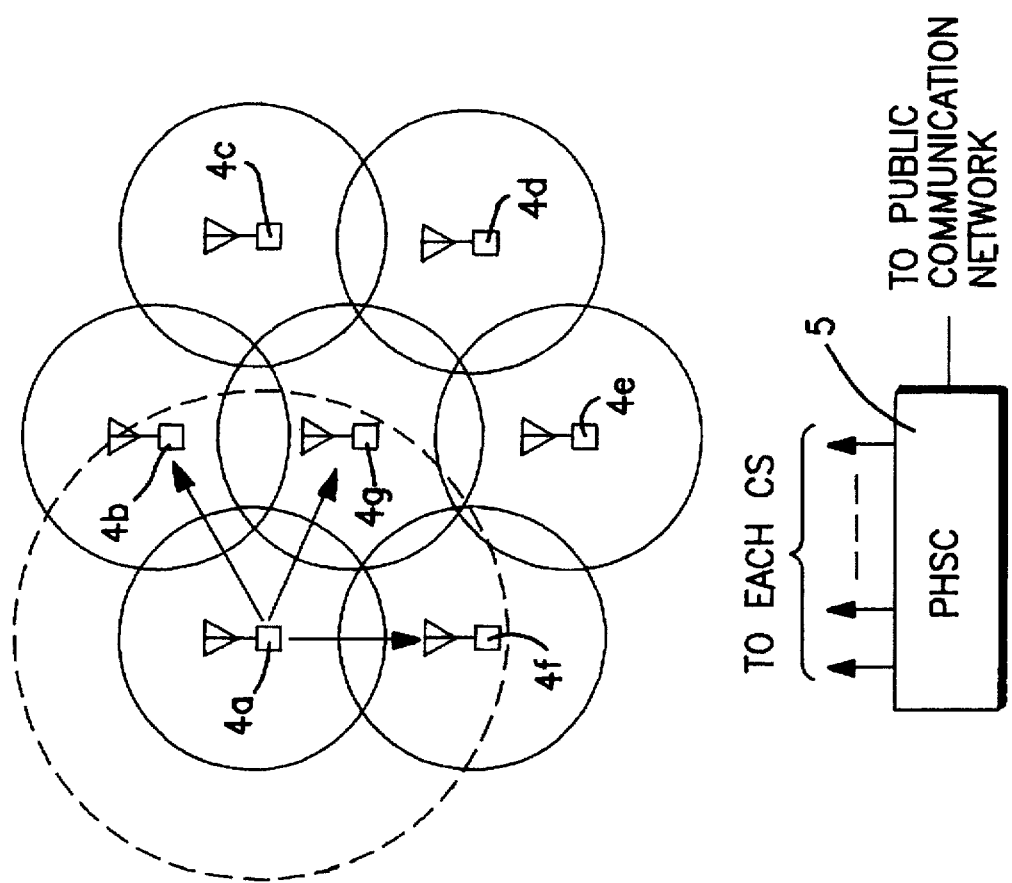
FIG. 1(A) and FIG. 1(B) respectively depict a view showing a configuration of the essential part and a testing procedure of the first embodiment of a system of the present invention.
Figure 1A:
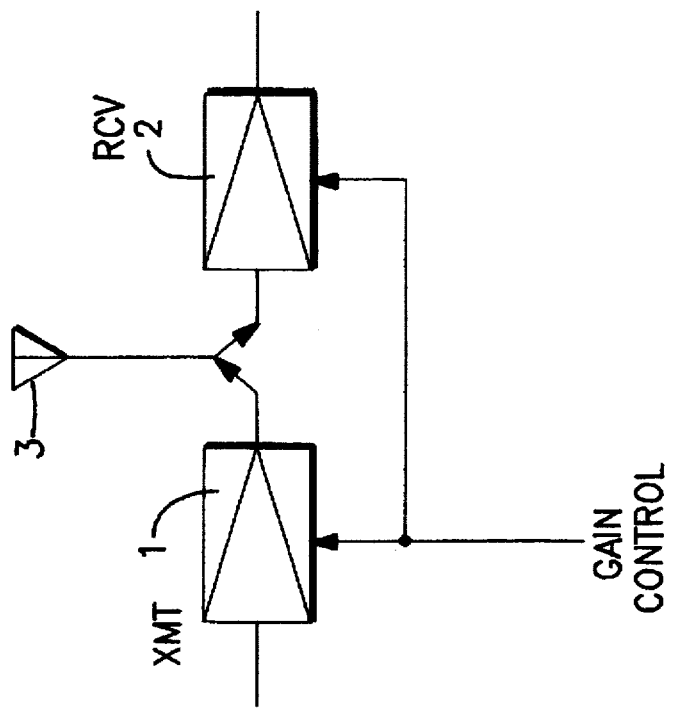

Embodiments of the present invention are described below with reference to the drawings. (A) of FIG. 1 shows a view of a configuration of the essential part of a CS in an embodiment of the present invention. Referring to (A) of FIG. 1, each CS which is a radio base station is configured such that transmitter output amplifier (XMT) 1 and receiver amplifier (RCV) 2 are connected to antenna 3. The gain of transmission output amplifier 1, that is, the transmitting electric power, and the gain of receiving amplifier 2, that is, the reception sensitivity, are variably controlled by a gain control signal produced in response to an instruction signal from a PHS connection control equipment.

The CSs configured above are arranged, as denoted at 4a to 4g in (B) of FIG. 1, such that they are individually located at the centers of ordinary cell ranges indicated by solid lines and are spaced away from each other to such a degree that the cell ranges thereof may partially overlap with adjacent cell ranges, thereby forming a radio area. Each of those CSs 4a to 4g performs radio communication with a PHS terminal which resides in the cell range of the CS itself and is a portable radio terminal, and is connected to a public communication network via PHS connection control equipment (hereinafter referred to as PHSC) 5 to allow communication between the PHS terminal and another terminal of the public communication network.

While the PHS normally operates in such a manner as described above, upon testing of a CS, it operates in the following manner. First, a testing instruction is delivered from PHSC 5 to a CS with which a test should be performed. For example, when it is intended to test CS 4a, a testing instruction is delivered from PHSC 5 to CS 4a. Consequently, a gain control signal is inputted to transmitter output amplifier 1 and receiver amplifier 2 shown in (A) of FIG. 1 in CS 4a so that the gains of transmitter output amplifier 1 and receiver amplifier 2 are controlled to levels higher than normal levels.

As a result, the transmitting electric power and the receiving sensitivity of CS 4a increase so that the cell range of CS 4a is expanded from its ordinary cell range indicated by a solid line in (B) of FIG. 1 to such a cell range indicated by a broken line in (B) of FIG. 1 in which CS 4a can communicate with CSs 4b, 4g, 4f and other CSs (not shown) adjacent to CS 4a.

Then, a test call of a predetermined pattern is produced by CS 4a under the control of PHSC 5, and the test call is transmitted from CS 4a first toward CS 4b. The test call is received by CS 4b. PHSC 5 performs comparison and collation to detect whether or not the receiving pattern of the test call received by CS 4b is the same as the test pattern transmitted from CS 4a. Similarly, under the control of PHSC 5, CS 4a successively produces and transmitts test patterns to adjacent CSs 4g and 4f and all of the other adjacent CSs not shown, and PHSC 5 performs comparison and collation between the receiving results by the receiving side CSs and the transmitted output patterns.

Then, PHSC 5 similarly sends a testing instruction to CS 4b. Consequently, the cell range of CS 4b is controlled to be expanded to such a degree that CS 4b can communicate with adjacent CSs. Thereafter, test calls are successively produced by CS 4b and transmitted to all of the adjacent CSs to confirm the normality of connection.

Thereafter, PHSC 5 repeats the operation described above for all of the CSs in a similar manner as described above and confirms the normality of the CSs from results obtained by the operation. Further, if an abnormal condition is found out in a test result, PHSC 5 analogies from a combination of test routes to specify the abnormal CS. The test described above is performed, for example, periodically after each predetermined interval of time.

In this manner, according to the present embodiment, CSs can be tested even if a maintenance engineer does not expressly go to the individual CSs. Further, since the CSs can be tested making use of existing PHSC 5 for testing, the test can be performed with a very inexpensive configuration comparing with that of an alternative system wherein PHS terminals are provided individually for CSs.

Next, the second embodiment of the system of the present invention is described. Referring to FIG. 2, the same components are denoted by the same reference characters. (A) of FIG. 2 shows a view of a configuration of the essential part of a CS in the present embodiment. Referring to (A) of FIG. 2, each CS is configured such that it includes, in addition to the configuration of the first embodiment wherein transmitter output amplifier (XMT) 1 and receiver amplifier (RCV) 2 are connected to antenna 3, pseudo PHS terminal 7 for testing.

The CSs of configured above are arranged, as denoted at 8a to 8g in (B) of FIG. 2, such that they are individually located at the centers of ordinary cell ranges indicated by solid lines and are spaced away from each other to such a degree that the cell ranges thereof may partially overlap with adjacent cell ranges, thereby forming a radio area. Each of those CSs 8a to 8g performs radio communication with a PHS terminal which resides in the cell range of the CS itself, and is connected to a public communication network via PHSC 9 to allow communication between the PHS terminal and another terminal of the public communication network.

While the PHS normally operates in such a manner as described above, upon testing of a CS, it operates in the following manner. First, a testing instruction is delivered from PHSC 9 to a CS with which a test should be performed. For example, when it is intended test CS 8a, a testing instruction is delivered from PHSC 9 to CS 8a. Consequently, a gain control signal is inputted to transmitter output amplifier 1 and receiver amplifier 2 shown in (A) of FIG. 2 in CS 8a so that the gains of transmitter output amplifier 1 and receiver amplifier 2 are controlled to levels higher than usual levels.

As a result, the transmitting electric power and the receiving sensitivity of CS 8a increase so that the cell range of CS 8a is expanded from its ordinary cell range indicated by a solid line in (B) of FIG. 2 to such a cell range indicated by a broken line in (B) of FIG. 2 in which CS 8a can communicate with CSs 8b, 8g, 8f and other CSs (not shown) adjacent to CS 8a.

Then, a test call of a predetermined pattern is produced by CS 8a under the control of PHSC 9, and the test call is transmitted from CS 8a first toward CS 8b. The test call is received by pseudo PHS terminal 7 provided in CS 8b and then transmitted back to CS 8a. PHSC 9 thus performs comparison and collation to detect whether or not the receiving pattern of the test call received by CS 8a is the same as the test pattern transmitted from CS 8a.

Similarly, under the control of PHSC 9, CS 8a successively produces and transmitts test patterns to the pseudo PHS terminals provided in adjacent CSs 8g and 8f and all of the other adjacent CSs not shown, and PHSC 9 performs comparison and collation between the receiving results by CS 8a when the test calls are transmitted back from the pseudo PHS terminals and the transmitted output patterns.

Then, PHSC 9 similarly sends a testing instruction to CS 8b. Consequently, the cell range of CS 8b is controlled to be expanded to such a degree that CS 8b can communicate with adjacent CSs. Thereafter, test calls are successively produced by CS 8b and transmitted to the pseudo PHS terminals of all of the adjacent CSs to confirm the normality of connection.

Thereafter, PHSC 9 repeats the operation described above for all of the CSs in a similar manner as described above and confirms the normality of the CSs from results obtained by the operation. Further, if an abnormal condition is found out in a test result, PHSC 9 analogizes from a combination of test routes to specify the abnormal CS. In the present embodiment, since each CS is provided with the means for increasing the transmitting and receiving capacities of a transmitter-receiver in response to a testing instruction from the connection control equipment and includes pseudo PHS terminal 7 such that a test call is produced under the control of the connection control equipment and transmitted between the portable radio communication system having the increased transmitting and receiving capacities and an adjacent portable radio communication system, although the configuration becomes expensive comparing with that of the first embodiment, also the present embodiment can confirm the normality of each CS efficiently.

As described above, according to the present invention, since a plurality of cell sites can be tested without provision of a pseudo portable radio terminal for each of the plurality of cell sites and without the necessity for a maintenance engineer to go to the individual CSs, the CSs can be tested efficiently with a very inexpensive configuration. Consequently, the present invention contributes very much to improvement in reliability of a portable radio communication system.

Further, according to the present invention, where a pseudo portable radio terminal is provided in each of the plurality of cell sites, since collation between a transmitted test signal and a received test signal to and from a cell site to which a testing instruction has been delivered by the connection control equipment is performed successively for all of the cell sites and determination between the normality and the abnormality of the cell sites is performed based on obtained results of the collation, the normality of the cell sites can be confirmed efficiently.

What is claimed is:

1. A cell site testing system for a portable radio communication system comprising a plurality of cell sites each of which is located at the center of individual cell range and performs radio communication with a portable radio terminal residing in the cell range of the cell site and allows communication between the portable radio terminal and another terminal of another communication network via a connection control equipment, wherein each of said plurality of cell sites includes means for increasing the transmitting and receiving capacities in response to a testing instruction from said connection control equipment so that the cell range of the cell site may include adjacent ones of said cell sites, and means of transmitting a test call for producing and transmitting a test call, and said connection control equipment performs collation between a received signal and a transmitted signal from and to an adjacent one of said plurality of cell sites, to which the testing instruction has been delivered, successively for all of said cell sites and performs determination between the normality and the abnormality of said cell sites based on obtained results of the collation.

2. A cell site testing system for a portable radio communication system as claimed in claim 1, wherein each of said plurality of cell sites further includes a pseudo portable radio terminal, and said connection control equipment performs operation for causing one of said plurality of cell sites, to which the testing instruction has been delivered, to transmit a test signal so that the test signal is transmitted back from said pseudo portable radio terminal provided in each cell site adjacent to the one of said plurality of cell sites, to the one of said plurality of cell sites to which the testing instruction has been delivered, and collating the transmitted test signal and the received test signal of the one of said plurality of cell sites to which the testing instruction has been delivered, successively for all of said cell sites and performs determination between the normality and the abnormality of said cell sites based on results of the collation.

* * * * *